(12) United States Patent
Hoke, Jr. et al.

(10) Patent No.: US 6,524,097 B2
(45) Date of Patent: Feb. 25, 2003

(54) METHOD AND APPARATUS FOR BACKING-UP OXY-FUEL COMBUSTION WITH AIR-FUEL COMBUSTION

(75) Inventors: Bryan Clair Hoke, Jr., Bethlehem, PA (US); Aleksandar Georgi Slavejkov, Allentown, PA (US); Mark Daniel D'Agostini, Allentown, PA (US); Kevin Alan Lievre, Allentown, PA (US); Joseph Michael Pietrantonio, Fogelsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/803,238

(22) Filed: Mar. 9, 2001

(65) Prior Publication Data

US 2001/0023053 A1 Sep. 20, 2001

Related U.S. Application Data

(63) Continuation-in-part of application No. 09/420,215, filed on Oct. 18, 1999.

(51) Int. Cl.[7] ............................. F23C 5/00; F23C 5/08; F23M 3/02
(52) U.S. Cl. ..................... 431/8; 431/354; 431/181; 431/190; 239/400
(58) Field of Search .................... 431/8, 10, 12, 431/351, 353, 354, 181, 187, 190; 239/400, 423, 566, 567, 568

(56) References Cited

U.S. PATENT DOCUMENTS

| | | | | |
|---|---|---|---|---|
| 5,302,112 A | * | 4/1994 | Nabors et al. | 239/418 |
| 5,458,483 A | * | 10/1995 | Taylor | 431/115 |
| 5,551,867 A | * | 9/1996 | Shamp | 431/154 |
| 5,772,427 A | * | 6/1998 | Laurenceau et al. | 431/154 |
| 5,823,769 A | * | 10/1998 | Joshi et al. | 432/179 |
| 5,833,447 A | * | 11/1998 | Bodelin et al. | 239/423 |
| 5,855,639 A | * | 1/1999 | Ougarane et al. | 431/8 |
| 5,904,475 A | * | 5/1999 | Ding | 431/10 |
| 5,984,667 A | * | 11/1999 | Philippe et al. | 431/10 |
| 6,041,622 A | * | 3/2000 | Duchateau et al. | 431/278 |
| 6,068,468 A | * | 5/2000 | Philippe et al. | 431/10 |
| 6,113,389 A | * | 9/2000 | Joshi et al. | 431/11 |
| 6,171,100 B1 | * | 1/2001 | Joshi et al. | 431/182 |
| 6,250,915 B1 | * | 6/2001 | Satchell et al. | 431/187 |
| 6,283,747 B1 | * | 9/2001 | Legiret et al. | 431/10 |
| 6,331,107 B1 | * | 12/2001 | Philippe | 431/10 |

* cited by examiner

Primary Examiner—Kathryn Ferko
(74) Attorney, Agent, or Firm—Robert J. Wolff

(57) ABSTRACT

Method and apparatus for continuation of combustion with an oxy-fuel combustion system when the supply of oxygen is temporally reduced or stopped. Air or oxygen enriched air and fuel are introduced into the device being heated in place of the oxy-fuel mixture to effect combustion and maintain the heating level in the furnace. Water cooling of the furnace gases is used to reduce the volume of exhaust gases when operating in the air or oxygen enriched air mode.

22 Claims, 8 Drawing Sheets

METHOD AND APPARATUS FOR BACKING-UP OXY-FUEL COMBUSTION WITH AIR-FUEL COMBUSTION

CROSS REFERENCE TO RELATED APPLICATION

This application is a continuation-in-part of U.S. patent application Ser. No. 09/420,215, filed Oct. 18, 1999.

STATEMENT REGARDING FEDERALLY SPONSORED RESEARCH OR DEVELOPMENT

Not applicable

BACKGROUND OF THE INVENTION

The present invention pertains to oxy-fuel methods and devices for producing elevated temperatures in industrial melting furnaces for such diverse products as metals, glass, ceramic materials and the like. In particular, the present invention pertains to combustion and methods and apparatus for continuation of combustion in the event of curtailed or terminated availability of oxygen for the oxy-fuel process.

Use of oxy-fuel burners in industrial processes such as glass melting, permits the furnace designer to achieve varying flame momentum, glass melt coverage, and flame radiation characteristics. Examples of such burners and combustion processes are described in U.S. Pat. Nos. 5,256,058, 5,346,390, 5,547,368, and 5,575,637 the disclosures of which are incorporated herein by reference.

One particularly effective process and apparatus for utilizing oxy-fuel combustion in the manufacture of glass concerns staged combustion, which is disclosed in U.S. Pat. No. 5,611,682, the specification of which is incorporated herein by reference.

In the beginning of the 1990s, glass manufacturers began converting furnaces from air-fuel combustion to oxy-fuel combustion. Oxygen enrichment of some air-fuel systems has been accomplished where the oxygen concentration is increased up to about 30%. Higher oxygen concentrations in the range of 40–80% are not used because of the increased potential for forming $NO_x$ pollutants. It has also been found that using oxy-fuel combustion where oxygen is present in a concentration of between 90–100% results in more favorable economics for the user.

Many of the larger oxy-fuel glass furnaces are supplied by oxygen generated on site using well-known cryogenic or vacuum swing adsorption techniques. It is customary and, to date, the only method for backing up the supply of on-site generated oxygen is to keep an inventory of liquid oxygen at the same site. Thus, when the on-site generation facility is taken off-line either due to a process problem or for routine maintenance, the inventory of liquid oxygen is utilized to supply the oxygen for the oxy-fuel combustion. This method of backing up the on-site generated oxygen requires large insulated tanks for storage of the oxygen in liquid form and vaporizers to enable the liquid oxygen to be converted into gaseous oxygen for use in the oxy-fuel process. It is conventional to utilize trucks to haul liquid oxygen to the site from a larger air separation facility. Utilizing liquid oxygen back-up with an on-site generated oxygen system permits the user to continue using an oxy-fuel process without interruption. Any oxy-fuel combustion system, e.g. one of those disclosed in the above-referenced patents, would benefit from on-site production having a back-up system.

Until now, backing up oxy-fuel glass furnaces with an inventory of liquid oxygen has not been considered to be a problem. However, with the conversion of more and more furnaces at multi-furnace sites and the use of oxy-fuel combustion in flat or float glass furnaces which are much larger and use more oxygen, liquid oxygen backup becomes a significant concern to the user because of the high capital cost of storage tanks and vaporizers. In addition to the cost issue, a logistics problem arises relating to the transportation of the liquid oxygen to the site and having enough liquid oxygen available on short notice from a nearby air separation facility used to produce the liquid oxygen. Transportation of liquid oxygen to user sites in remote locations becomes even a greater problem fraught with greater difficulties.

Normally, when a glass furnace is converted from air-fuel to oxy-fuel, heat recovery devices such as regenerators and air supply systems are removed. For the user, one of the incentives to convert to oxy-fuel is reduced capital costs due to elimination of the heat recovery devices. Due to the design of oxy-fuel burners, the furnace cannot be operated by simply substituting air for oxygen in conventional combustion systems in use today. The pressure requirement to provide an equivalent amount of contained oxygen using air in an oxy-fuel burner would be extremely high, requiring an expensive air supply system. Further, some oxy-fuel burners would be sonic flow limited if fired at an equivalent firing rate.

When using oxy-fuel combustion where the oxygen supply is curtailed or disrupted, the conventional technique is to maintain the furnaces in a condition called "hot hold". Hot hold is a condition where production is stopped and the furnace is kept hot so that the glass does not solidify. Allowing the glass to solidify would severely damage the furnace. Several companies specialize in furnace heat-ups following cold furnace repairs. They use specially designed air-fuel burners to provide the initial increase in temperature in the furnace. In case of oxygen supply disruption, the same burners could be used to provide enough heating for hot hold. In this procedure, no special temperature profile for production would be attempted and the maximum temperature achieved by these devices could be about 2200° F. This temperature is not sufficient for production of glass and is the least preferred option to be used by glass manufacturers. The cost of not producing glass is very high to the glass manufacturer, in terms of lost product sales as well as disruption of downstream glass forming lines.

Therefore, there is a definite need to provide a method and apparatus for maintaining production in a furnace used for glass manufacturing in the event of a curtailment or disruption in the availability of oxygen.

BRIEF SUMMARY OF THE INVENTION

The present invention pertains to a method and apparatus to backup an oxy-fuel combustion system with an air-fuel combustion system that can be used with or oxygen enrichment to maintain production in an industrial furnace such as glass melting furnace. According to the present invention, a system has been devised which permits oxy-fuel, air-fuel, or an oxygen enriched air-fuel operation. The burner and burner block assembly according to the present invention permits the user to operate in different modes without replacing the burner block. Thus, the same burner block can be used for all modes of operation for providing combustion close to the glass for better heat transfer by introducing fuel underneath the oxidant in the air-fuel and oxygen enriched air-fuel operating modes. A burner according to the present invention can utilize oxygen enrichment to effect the process.

According to the present invention, a burner block, i.e. conventional burner block such as described in U.S. Pat. No. 5,611,682 can be used for either oxy-fuel or air-fuel combustion, allowing the combustion system to be rapidly converted between the two modes. According to the present invention, when a problem with oxygen supply occurs, the oxy-fuel burners would be turned off, disconnected, and replaced by air-fuel backup burners that have the same configuration for a connection to the burner block. With the air-fuel backup system, the user would retain the air supply systems from previous air-fuel systems used in the melting operation or, air blowers would be supplied as part of the back up system. Air-fuel burners according to the present invention should be capable of firing at rates substantially higher than the oxy-fuel burners.

In its' broadest aspect the present invention pertains to using air or oxygen enriched air and fuel as a substitute for oxy-fuel combustion, in the event oxygen supply is diminished or interrupted in order to maintain heating in an industrial environment, the air or oxygen enriched air being introduced into the environment in sufficient volume with a fuel to effect the required level of heating. The substitution of air or oxygen enriched air-fuel combustion for oxy-fuel combustion can be made in any manner to achieve equivalent heating to that obtained using oxy-fuel combustion. In this aspect water cooling of the exhaust gases will be beneficial for lowering exhaust gas volume.

Thus, in one aspect the present invention is a process for maintaining heating of a furnace to an elevated temperature using oxy-fuel combustion, wherein an oxy-fuel flame is introduced into the furnace using an oxy-fuel burner, the burner having an oxy-fuel firing rate, and a separate oxidizer stream is introduced underneath the oxy-fuel flame, when oxygen supply for the flame and the oxidizer is eliminated or terminated comprising the steps of; introducing one of air or oxygen enriched air into said furnace in place of the oxy-fuel flame, and replacing the separate oxidizer stream with fuel and introducing the fuel into the furnace beneath the one of air or oxygen-enriched air to provide an air-fuel flame having a firing rate equal to or greater than the oxy-fuel firing rate to maintain the temperature in the furnace.

In another aspect, the present invention is a process for maintaining heating of a furnace to an elevated temperature using oxy-fuel combustion, wherein an oxy-fuel flame is introduced into the furnace using an oxy-fuel burner, the burner having an oxy-fuel firing rate, the burner mounted proximate a separate passage for introducing an auxiliary fluid, e.g. an oxidizer into the oxy-fuel flame, comprising the steps of; closing the separate passage during oxy-fuel combustion when oxygen supply for the flame is eliminated or terminated replacing the oxy-fuel flame with a stream of air or oxygen-enriched air, opening the separate passage and introducing a stream consisting of fuel into the furnace through the separate passage proximate the stream of air or oxygen-enriched air to provide an air-fuel flame having a firing rate equal to or greater than the oxy-fuel firing rate to maintain temperature in the furnace.

A further aspect of the present invention is a process for maintaining heating of a furnace, the furnace having a burner block having an upper passage and a lower passage the passages being co-extensive, to an elevated temperature using oxy-fuel combustion, wherein an oxy-fuel flame is introduced into the furnace using an oxy-fuel burner, the burner having an oxy-fuel firing rate, the oxy-fuel burner adapted to introduce the oxy-fuel flame through the upper passage of the burner block, comprising the steps of; closing the lower passage of the burner block when oxy-fuel combustion is used for heating the furnace, then when oxygen supply for the flame is eliminated or terminated, opening the lower passage of the burner block, introducing a stream consisting of air or oxygen-enriched air into the furnace through the upper passage, and introducing a stream consisting of fuel into the furnace through the lower passage to provide an air-fuel flame having a firing rate equal to or greater than the oxy-fuel firing rate to maintain the temperature in the furnace.

In yet a further aspect, the present invention is a combustion system of the type having an oxy-fuel burner adapted to produce an oxy-fuel flame with a burner block mounted on the burner, the burner having an oxy-fuel firing rate, the burner block having a first passage with a first end in fluid tight relation to a flame end of the burner and a second end adapted to direct the flame produced by the burner for heating in industrial environments and a second separate passage in the burner block disposed beneath and coextensive with the first passage, the second passage terminating in a nozzle end in the second end of the burner block to direct oxidizing fluid underneath and generally parallel to the oxy-fuel flame, the improvement comprising; first means to introduce one of air or oxygen enriched air through the burner into the burner block in place of the oxy-fuel flame, and second means to introduce fuel into the second separate passage in the burner block in place of the oxidizing fluid, thereby producing an air-fuel combustion flame with an air-fuel firing rate equal to or greater than the oxy-fuel firing rate, whereby the combustion system can continue to heat the industrial environment in the event supply of oxygen is interrupted or reduced.

A still further aspect, the present invention is a combustion system adapted to provide direct or staged combustion in a furnace using in oxy-fuel burner adapted to produce an oxy-fuel flame with a burner, the burner having an oxy-fuel firing rate, the burner used with a burner block having an upper passage and a lower passage the passages being co-extensive along separate but parallel axes, the burner mounted in fluid tight relationship to the burner block to permit the burner block to direct the oxy-fuel flame through the upper passage of the burner block with the lower passage of the burner block closed during non-staged oxy-fuel combustion thus permitting the combustion system to be changed from oxy-fuel combustion to air fuel combustion by introducing a stream consisting of air or oxygen enriched air through the burner into the furnace and opening the second passage and introducing a stream consisting of fuel into and through the second passage thereby enabling the combustion system to produce an air-fuel combustion flame with an air-fuel firing rate equal to or greater than the oxy-fuel firing rate, whereby the combustion system can continue to heat the industrial environment in the event the supply of oxygen is interrupted or reduced.

In still another aspect, the present invention is a combustion system of the type adapted to provide direct or staged combustion in a furnace using an oxy-fuel burner adapted to produce an oxy-fuel flame with a burner, the burner having an oxy-fuel firing rate, the burner used with a burner block having an upper passage and a lower passage, the passages being coextensive along separate but parallel axes, the burner mounted in fluid tight relationship to the burner block to permit the burner block to direct the oxy-fuel flame through the lower passage of the burner block with the upper passage of the burner block closed during oxy-fuel combustion, thus, permitting the combustion system to be changed from oxy-fuel combustion to air fuel combustion by introducing a fuel stream through the burner and into the furnace and opening the upper passage and introducing a stream consisting of air or oxygen enriched air into and through the upper passage, thereby enabling the combustion system to produce an air-fuel combustion flame with an air-fuel firing rate equal to or greater than the oxy-fuel firing rate, whereby the combustion system can continue to heat the furnace in the event the supply of oxygen is interrupted or reduced.

Thus another aspect, the present invention contemplates reducing exhaust gas volume in a furnace being heated according to the method and apparatus of the invention by liquid water cooling of the exhaust gases exiting the furnace. In this aspect the present invention is a process for maintaining heating of a furnace to an elevated temperature using oxy-fuel combustion, wherein an oxy-fuel flame is introduced into the furnace and exhaust gases exit the furnace, and wherein the exhaust gases must be cooled after exiting the furnace, when oxygen supplied for the oxy-fuel flame is eliminated or terminated, comprising the steps of: replacing the oxy-fuel flame with an air-fuel flame, the air fuel flame having a firing rate equal to or greater than the firing rate for the oxy-fuel flame, and cooling the exhaust gases exiting from the furnace through injection and evaporation of liquid water to decrease the volume of the exhaust gases.

DETAILED DESCRIPTION OF THE INVENTION

Figure 1:
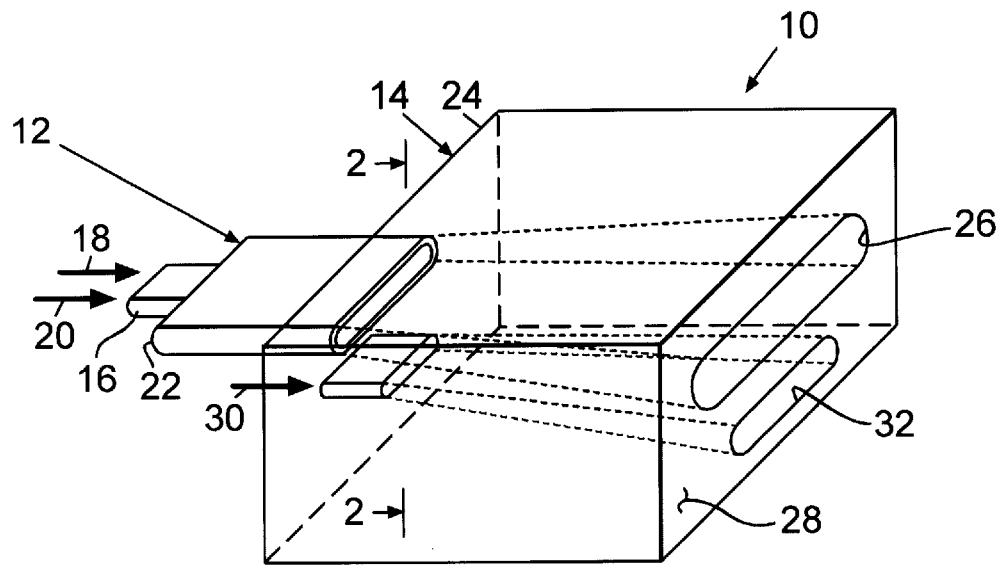
FIG. 1 is a schematic perspective view of a conventional staged combustion apparatus.

The present invention pertains to a method and apparatus to back-up an oxy-fuel heating system with an air-fuel heating system. According to the invention, the back-up air-fuel system can be operated with or without oxygen enrichment of the air. The burner system according to the invention permits at least two distinct modes of operation, e.g. oxy-fuel or air-fuel. The method and apparatus of the invention provide the unique opportunity to use the same burner block for all modes of operation and providing combustion close to the glass for better heat transfer by introducing fuel underneath the oxidant in the air-fuel and oxygen enriched air-fuel modes. For the purposes of this invention oxy-fuel combustion is taken to mean combustion with 80% to 100% by volume oxygen. Oxygen enrichment is taken to mean between 22% and 80% by volume oxygen concentration.

According to the invention the same burner block or pre-combustor can be used during either oxy-fuel or air-fuel operation, allowing the combustion system to be rapidly converted from one mode to the other. In the case where an operator encounters a problem with the oxygen supply, the oxy-fuel burners would be turned off, disconnected, and replaced with air-fuel back-up burners that have the same connection to the burner block. With an air-fuel back-up system, a glass manufacturer would retain its air supply systems present before conversion to oxy-fuel combustion, or blowers would be supplied as part of the back-up system. It is important that the air-fuel back-up burners are capable of firing at a rate substantially higher than that of the oxy-fuel burners being backed-up.

Higher firing rate for the back-up air-fuel burner is required because of the additional energy losses caused by heating and expelling nitrogen. Furthermore, the air used for combustion in a back-up system will typically not be pre-heated which results in a decrease in furnace efficiency relative to a typical air-fuel furnace. A simplified thermodynamic calculation illustrates the need to increase the fuel firing rate when non preheated air is used for combustion. The assumptions for this example are: fuel and oxygen completely react with no excess oxygen and no intermediate products remaining; all gases (e.g. methane, air, or oxygen) enter the furnace at 77° F.; and, all gases exhaust the furnace at 2800° F. after complete combustion. Under these conditions, 2.65 times the firing rate is required when firing with air as compared to firing with 100% oxygen in order to maintain the same available heat. Available heat is the energy transferred to the charge and for heat loss from the furnace.

Thus, the total oxidant volumetric flow rate will increase dramatically as the oxygen flow rate is reduced. The volume of the oxidant stream is increased by a factor of 4.76 because of the addition of nitrogen and an additional 2.65 times because of the higher firing rate requirement. This means that the flow rate of the oxidant stream is increased by about 12.6 times when air is completely substituted for oxygen.

A major concern with using air-fuel combustion in an oxy-fuel burner assembly is the air supply pressure required to accommodate the higher gas volumes needed. The present invention utilizes a low velocity oxidizer system. Thus, even when firing in an air-fuel mode, pressure drop is low enough to permit the use of relatively inexpensive air blowers, while maintaining burner firing rates equal to or greater than those used with oxy-fuel firing. This, in turn, allows for continuity of production when a user, e.g. a glass melter, is operating in the back-up mode during an emergency loss or curtailment of oxygen supply.

Oxy-fuel burners with oxidant velocities greater than about 90 ft/sec. at any point in the burner, design will be sonic limited at the equivalent-firing rate when air is used as the oxidant at full production. The sonic velocity is defined by the equation $a=\sqrt{kRT}$, where k is the ratio of specific heats (1.4 for air), R is the gas constant (287 J/kg K), and T is the absolute temperature. For air at 25° C. (77° F.), the sonic velocity is 346 m/sec. (1135 ft/sec.). For an oxy-fuel burner with an oxygen velocity of 100 ft/sec., the equivalent flow rate using air will be 12.6 times that amount or 1260 ft/sec. which is greater than the sonic velocity. Therefore, to avoid a sonic limit, the oxy-fuel burner must be designed with an oxygen velocity of less than 90 ft/sec., if complete air substitution for oxygen is to be used without changing any part of the burner assembly. Alternatively, this limit can be avoided according to one aspect of the invention where the burner body is changed when switching between operating modes. The burner block must be designed so that the superficial velocity is less than the sonic velocity for air-fuel operation.

The shape of the flame is also a concern for traditional oxy-fuel burners operating at 2.65 times their rated firing capacity especially with 12.6 times the volumetric flow rate through the oxidant passage(s). The embodiment of the invention disclosed below provides a suitable flame shape for both oxy-fuel and air-fuel operation.

Thus according to the invention, concerns relating to oxidant supply pressure, velocity limits, and flame shape are overcome according to the present invention. We have found it is possible to enable a user to switch from oxy-fuel firing to air-fuel firing using the same burner block while modifying the burner body of a Cleanfire® HR™ burner offered to the trade by Air Products and Chemicals Inc. of Allentown, Pa.

Referring to FIG. 1, a staged combustion apparatus 10 includes an oxy-fuel burner 12 and a precombustor or burner block 14. The oxy-fuel burner 12 includes a central conduit 16 for receiving a fuel such as natural gas, which is indicated by arrow 18. A source of oxygen indicated by arrow 20 is introduced into a passage that is between the fuel conduit 16 and an outer concentric conduit 22. The burner is described in detail in U.S. Pat. No. 5,611,682, the specification of which has been incorporated herein by reference. The burner 12 is fitted to a burner block 14 and held in fluid tight relationship thereto at a first end 24 of the precombustor or burner block 14. The burner block 14 contains a first or central passage 26, which extends from the first end 24 to a discharge end 28 of the burner block 14. The passage 26 has a width greater than the height and has a diverging shape as shown and as described in the '682 patent. In order to have staged combustion, staging oxygen represented by arrow 30 is introduced into a second passage 32 in the burner block 14. The passage 32 has a shape complimentary to that of the central passage and has a greater width than height as illustrated and again as described in detail in the '682 patent.

Figure 2:
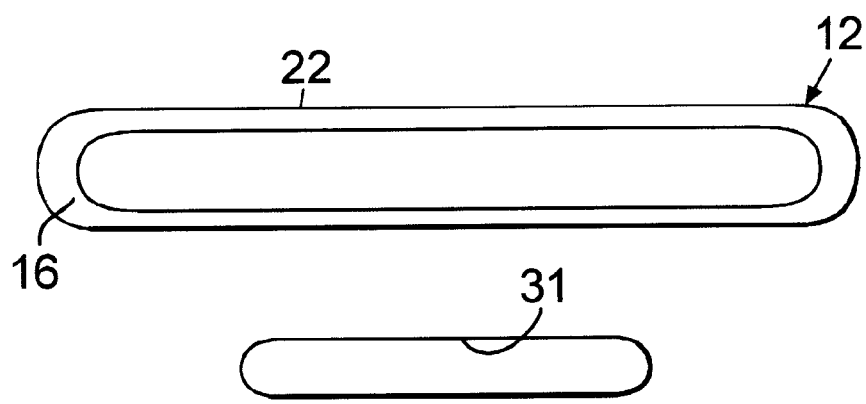
FIG. 2 is a view taken along line 2—2 of FIG. 1.

Referring to FIG. 2, at the first end 24 of the precombustor 14 the oxy-fuel burner 12 has a discharge end with a central fuel conduit 16 surrounded by an oxygen passage 22. The staging oxygen exits a passage 31 that is disposed below the passage for the oxy-fuel flame as shown in FIG. 2.

Figure 3:
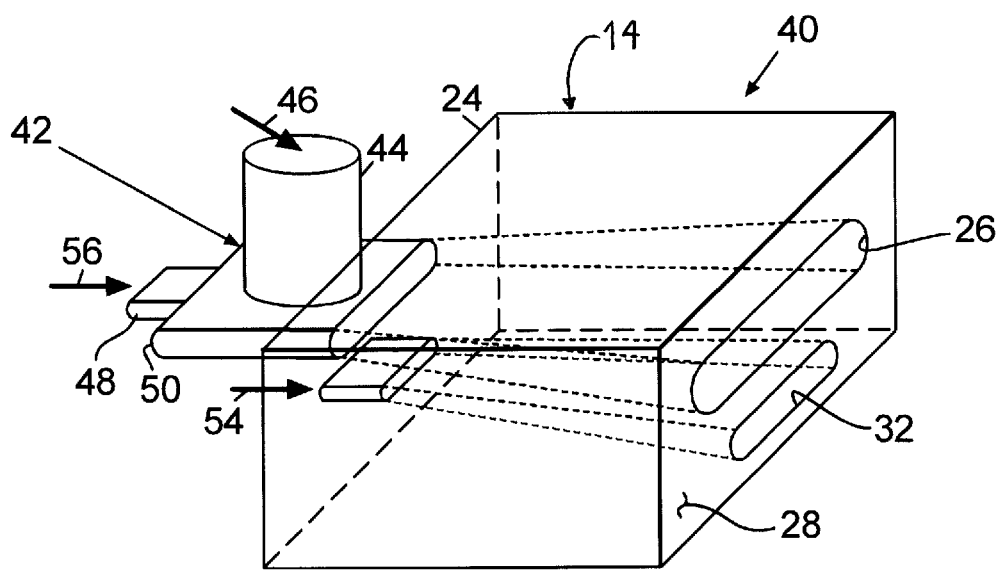
FIG. 3 is a schematic perspective view of an apparatus according to the present invention.

FIG. 3 shows a combustion apparatus according to the present invention. The combustion apparatus 40 includes a burner block 14, which is identical to the burner block 14 of FIG. 1. According to the present invention, the burner 42 is similar to the oxy-fuel burner 12 of FIG. 1 with a device 44 to permit introduction of air or oxygen enriched air into the upper passage 50 of burner 42. The burner 42 is also adapted to introduce air or oxygen enriched air by passage 48 of burner 42 into upper passage 50 where oxidant from passages 44 and 48 are mixed. Arrow 46 represents introduction of air or air and oxygen into the device 44 which in turn introduces the air or oxygen enriched air into the passage 50. Arrow 56 represents introduction of air, oxygen, or air and oxygen into the passage 50. The air or oxygen enriched air moves from passage 50 into the central passage 26 of the burner block and exits to the furnace.

Figure 4A:
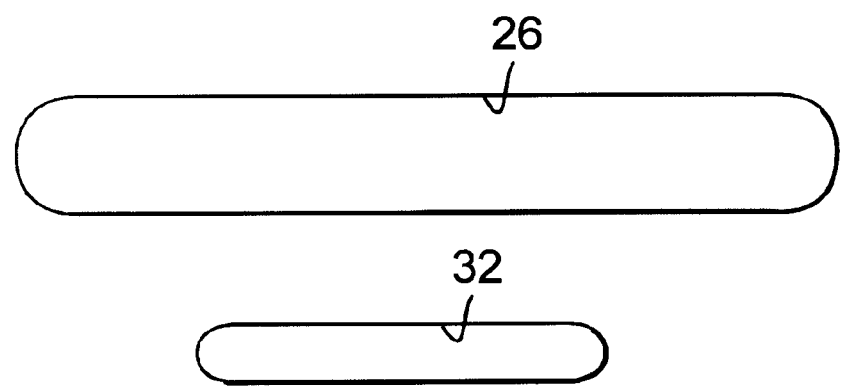
FIG. 4a is a front view of the burner block or pre-combustor of the apparatus of FIG. 3.

When the burner is converted over to non or limited oxy-fuel firing, the supply of staging oxygen (indicated by arrow 30 in FIG. 1) is replaced by fuel, represented by arrow 54, so that fuel or oxygen enriched fuel exits passage 32 of the burner block 14. Shown schematically in FIG. 4a are the passages 26 and 32 at the front end of the burner block 14 with passage 26 being used to introduce air or oxygen enriched air into the furnace and passage 32 being used to introduce fuel or oxygen enriched fuel into the furnace. When the burner 42 is used in the air-fuel firing mode, the air or oxygen enriched air flows through passage 26 and the fuel or oxygen enriched fuel flows through the passage 32. The burner block design is such that a stable air-fuel flame is established because of the recirculation region between the two openings. Oxygen may be added to the fuel to increase luminosity of the flame, a technique well known in the art.

In addition to the air-fuel firing capability, the device of the present invention permits varying degrees of oxygen enrichment to be accomplished. Use of oxygen enrichment improves flexibility during operation in the backup mode by decreasing the use of oxygen supplied from liquid oxygen storage. It also permits adjustment of the flame length by adding oxygen to the air flow.

Supplemental oxygen can be supplied by various methods. For example the air can be enriched with oxygen, oxygen lances could be supplied through either or both the primary passage 26 of burner block 14 or the staging port 32, or separate oxygen lances could be installed at a distance away from the precombustor 14 or staging port 32. Oxygen introduced through the staging port with the natural gas could provide means to create soot for better radiation heat transfer to the furnace charge.

Using the method and apparatus of the present invention makes it possible to maintain maximum temperature and temperature distribution needed for glass production. Oxygen enrichment or oxy-fuel firing, preferably should be used on burners with the highest firing rates near the hot spot in the furnace. This will reduce the flow rate of air needed for these burners and reduce the pressure drop. Also, oxygen enrichment increases the peak flame temperature and thereby increases heat transfer in the hot spot. It is well known that a hot spot is required in glass making furnaces to establish proper convection cells in the glass melt which are required to produce glass of acceptable quality.

Other air-fuel technologies can be used to maintain hot hold conditions. This invention is intended to permit the user to continue production. The minimum firing rate provided by the air-fuel backup system is such that at least 20% of the design production rate can be maintained. It is believed that this production rate is sufficient to allow a float glass producer to maintain a continuous glass ribbon in the float bath.

Higher velocity oxy-fuel burners could be modified for low velocity operation by adding one or more inlet ports to use the technology disclosed herein. These inlets could be normally closed or used for staging during oxy-fuel operation.

Figure 4B:
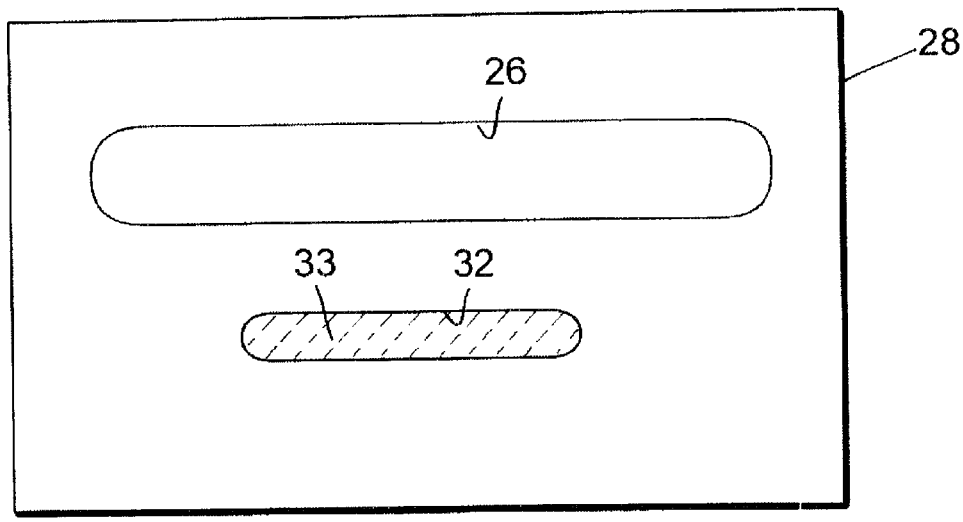
FIG. 4b is a front view of the burner block or pre-combustor of the apparatus of FIG. 3 used for non-staged oxy-fuel combustion.

FIG. 4b shows the burner block 28 having an upper passage 26 and the lower passage 32. If the burner block is to be used with oxy-fuel combustion where there is no staged combustion, i.e. no supplemental oxygen or oxygen enriched air is used, the lower passage 32 is closed by a plug 33 of a refractory or ceramic material. The plug prevents air or other environmental gases from being ingested through the passage 32 by any negative pressure in the furnace when the passage is not needed in the combustion process. According to the present invention after the oxygen supply is diminished or curtailed, oxygen or oxygen enriched air is introduced through the passage 26. At the same time the operator removes the plug 33 and introduces a fuel gas through the passage 32 to provide an air or oxygen enriched air fuel mixture for combustion and heating of the furnace so that there is no diminishing of the heating of the furnace.

Figure 4C:
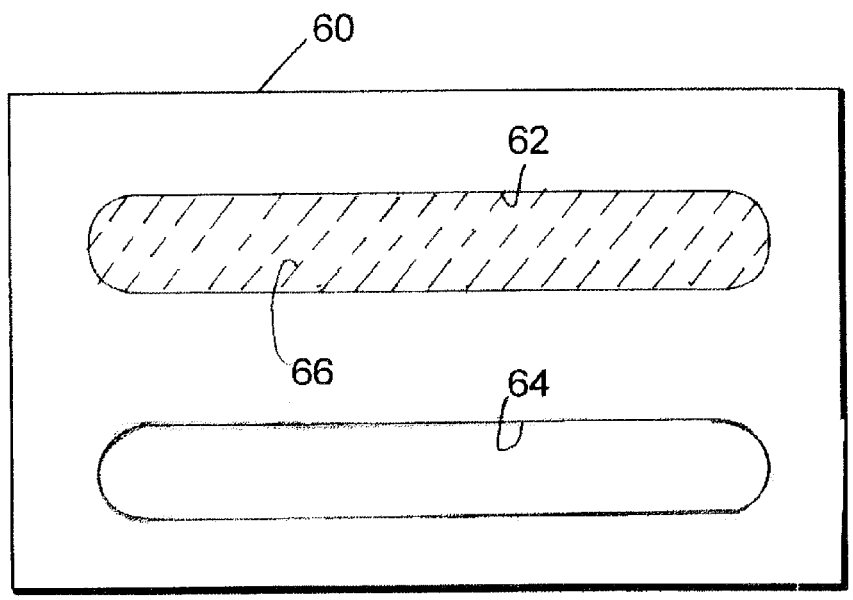
FIG. 4c is a front view of a burner block or pre-combustor used in an alternate embodiment of the invention.

FIG. 4c shows an alternate embodiment of a burner block 60 having an upper passage 62 and a lower passage 64 wherein the lower passage 64 can be used to introduce an oxy-fuel flame into the furnace during normal combustion. Here again, if non-staged combustion is to be employed a refractory or ceramic plug 66 is placed in the upper passage 62 to prevent ingestion of unwanted environmental gases into the furnace during oxy-fuel combustion. Here again, if there is a curtailment in the oxygen or termination of the oxygen supply the upper passage 62 can be unplugged and air or oxygen-enriched air can be introduced into this passage and fuel gas can be introduced into the lower passage, 64 to provide the necessary air or oxygen-enriched air-fuel combustion in the furnace.

It should be noted that the present invention has been described in terms of using a burner block. However, instead of using a burner block which is either mounted permanently in the furnace wall or mounted on the end of the burner and removably mounted in the furnace wall one could employ passages directly through the wall of a furnace the passages adapted to receive the burner or the alternate equipment such as described in connection with the burner block.

It is also within the purview of the present invention to utilize any means to introduce adequate air or oxygen enriched air-fuel combustion into the furnace in order to provide the same heating as would be obtained with an oxy-fuel combustion process. Here again, for ease in understanding of the invention references made to the use of burner blocks include permanent passages in the furnace wall. Other techniques could be employed such as plugging both passages in the burner block or the furnace wall and introducing an air or oxygen-enriched air-fuel burner through a separate passage in the furnace, through the wall in the furnace through a door in the furnace, or in any manner that is suitable to achieve the same level of combustion in the furnace, as is shown by the present invention.

Also, one or more additional inlet ports could be added on-the-fly prior to commencing air-fuel backup by drilling holes in the refractory wall and introducing fuel below the air or oxygen enriched air. A key to the present invention is to introduce the fuel and the oxidant in a manner that will create the flame close to the glass for better heat transfer.

Another alternative for furnaces using high velocity burners is to replace the burner blocks with blocks having larger openings to reduce the pressure drop. With this method there is the danger of introducing foreign refractory material into the glass melt during the replacement procedure which could cause glass defects. Furthermore, replacement of burner blocks on the fly requires substantial time, possibly too long to avoid interruption of production.

Figure 5:
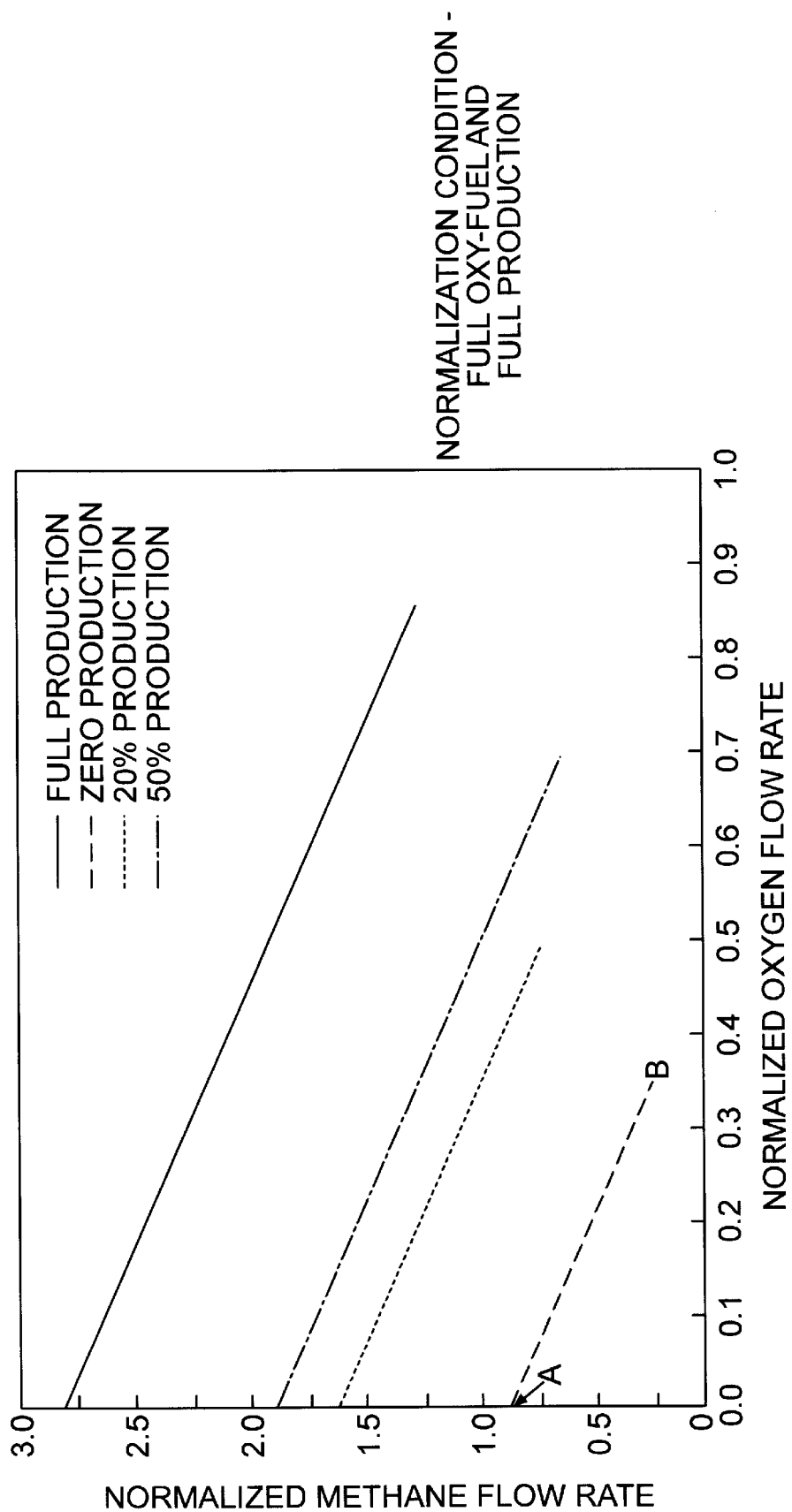
FIG. 5 is a plot of normalized methane flow rate against normalized oxygen flow rate for conditions from zero production to full production.

FIG. 5 shows the methane flow rate required for hot hold conditions (zero production rate), 20%, 50% and full production conditions, assuming, for example, that 35% of the available heat is required for furnace wall heat losses under full production conditions. Hot hold could be achieved at lower firing rates than the plot shows since the overall furnace temperature would be lowered thereby reducing the wall heat losses. This plot assumes that the heat losses remain the same, independent of production rate or oxygen usage. The methane flow rate is normalized based on the methane flow rate for full production with 100% oxy-fuel, and the oxygen flow rate is normalized based on the oxygen flow rate for full production with 100% oxy-fuel. The normalized oxygen flow rate is 1.0 when all of the oxidant for combustion is supplied by the oxygen source (no air) and zero when all of the oxidant for combustion is supplied by air.

Figure 6:
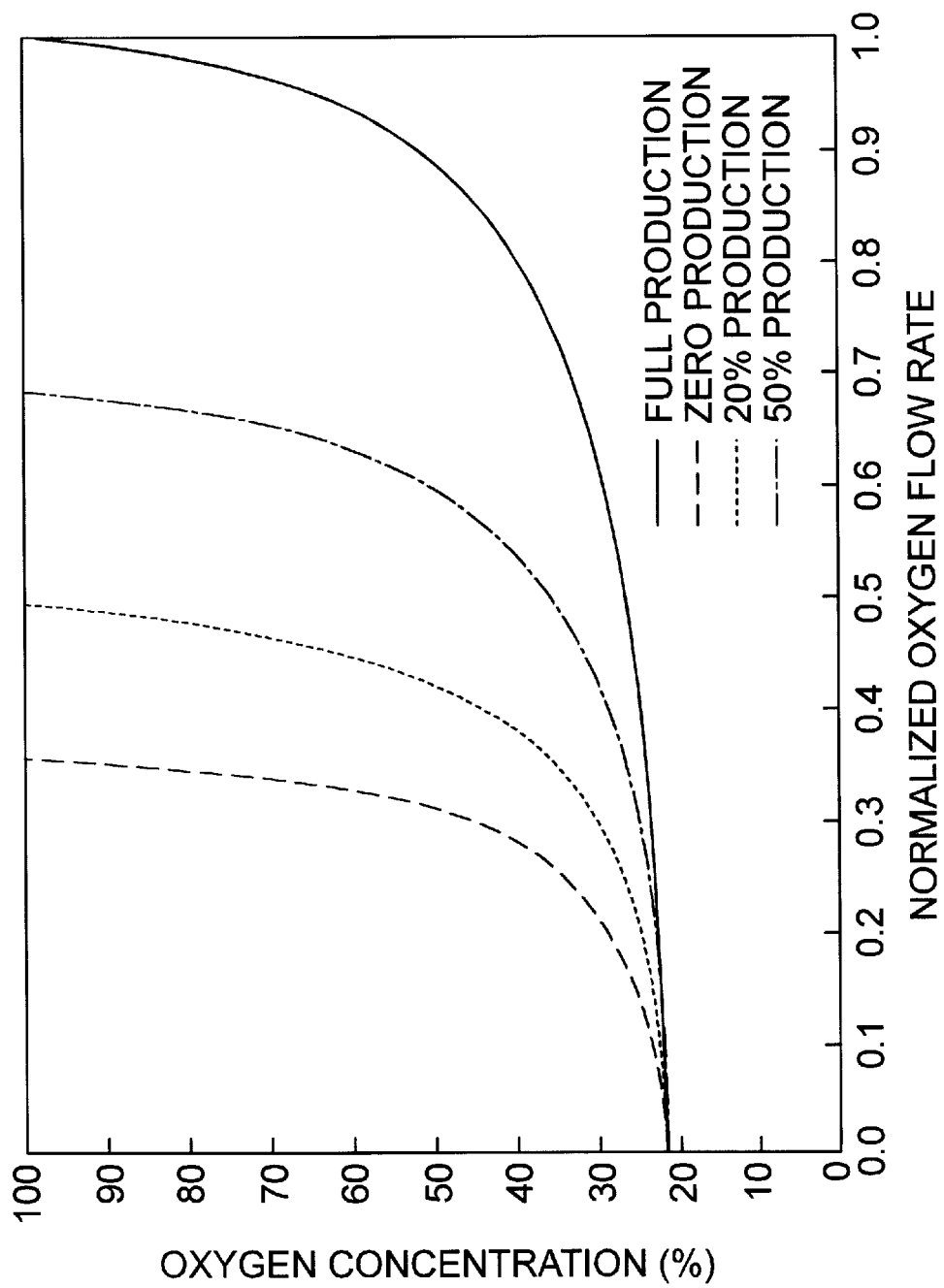
FIG. 6 is a plot of oxygen concentration against normalized oxygen flow rate for the production rates of FIG. 5.

FIG. 6 is a corresponding plot of oxygen concentration as a function of normalized oxygen flow rate for each of the production rates shown in FIG. 5.

As indicated by point A in FIG. 5, hot hold using only air as the oxidant for combustion (zero normalized oxygen flow rate), the methane flow rate is about the same as required for 100% oxy-fuel at full production (normalized value equal to 1). Hot hold could also be maintained at 35% of the full production oxygen flow rate with 35% of the full production methane flow rate (point B). Referring to FIG. 6 (point B), the operating condition represented by point B corresponds to 100% oxy-fuel with no air dilution.

FIG. 5 shows that the oxygen flow rate and the methane flow rate can each be reduced by half to produce 20% of full production. This means that if production is limited to 20% of the full production rate, the stored oxygen supply can last two times longer. According to FIG. 6, this corresponds to 100% oxy-fuel firing.

At 50% production, the oxygen flow rate could be reduced to half of the full production flow rate and the methane at about 95% of the full production flow rate. According to FIG. 6, the oxygen concentration for this operating condition would be about 35%.

The exhaust gas temperature from an oxy-fuel furnace is higher than a corresponding air-fuel furnace after the heat recovery device. Glass manufacturers therefore must decrease the temperature of the oxy-fuel combustion products by some method before the gases enter the sections of the flue system fabricated with metal. Because of current air pollution regulations, fuel gas treatment for glass furnaces typically include particulate removal devices, such as electrostatic precipitators or bag houses. These devices have a maximum operating temperature significantly lower than the oxy-fuel furnace exhaust temperature, typically around 1000° F. Therefore, exhaust gases must be cooled by cold (ambient) dilution air before these devices.

Figure 7:
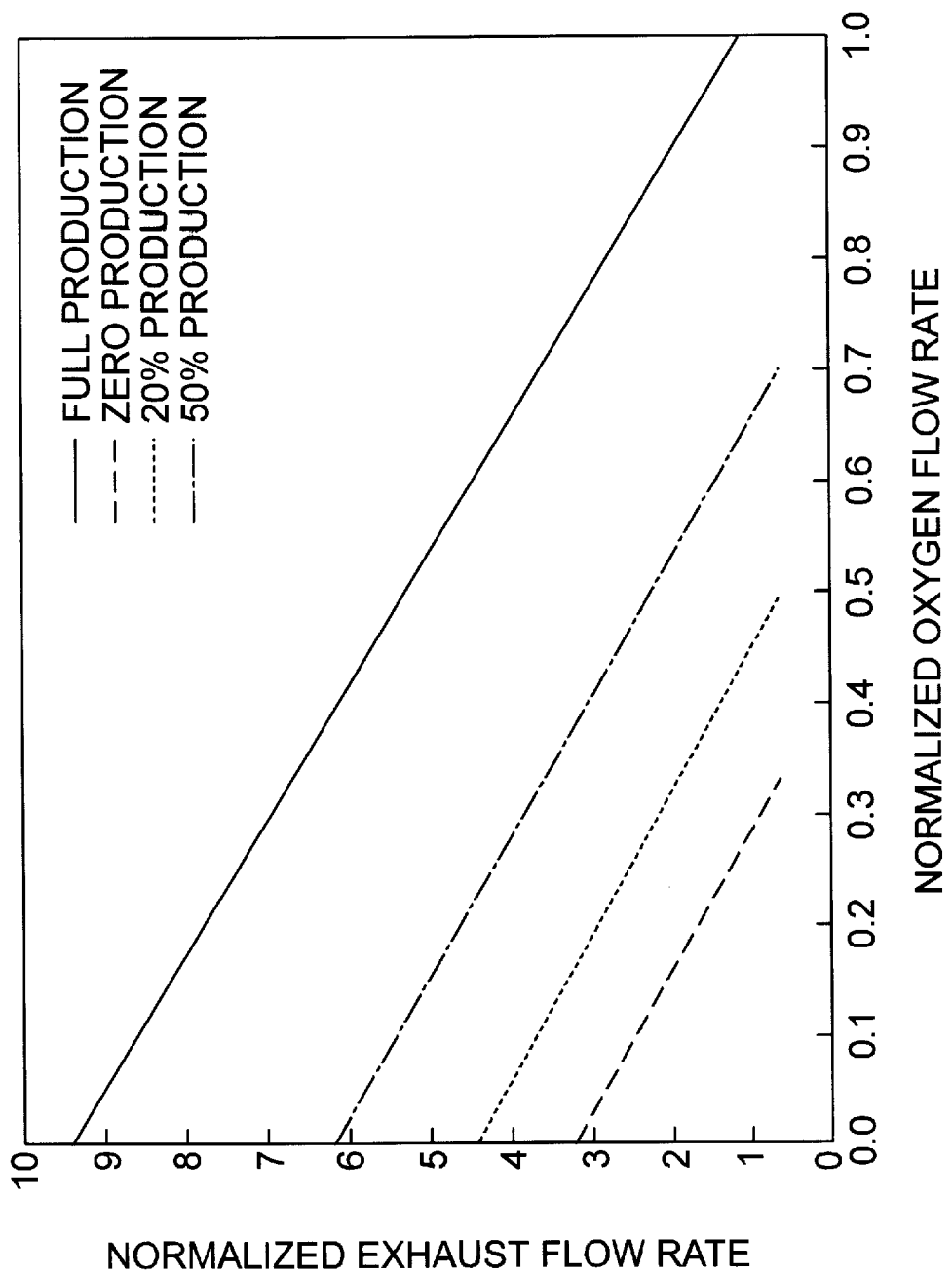
FIG. 7 is a plot of normalized exhaust gas flow rate against normalized oxygen flow rate for several production rates.

If air is substituted for oxygen for combustion in a furnace designed for oxy-fuel combustion, the exhaust volume will be increased substantially. FIG. 7 shows how the exhaust flow rate increases as air is substituted for oxygen for several production rates. The same assumptions regarding inlet and outlet temperatures and heat losses used for the previous figures are used to generate this figure. The exhaust flow rate is normalized with respect to the exhaust flow rate for full production with 100% oxy-fuel. For full production, the exhaust flow rate will be increased by more than nine times if oxygen is completely replaced by air. More than three times the exhaust flow rate can be expected at hot hold conditions where air completely replaces oxygen.

Figure 8:
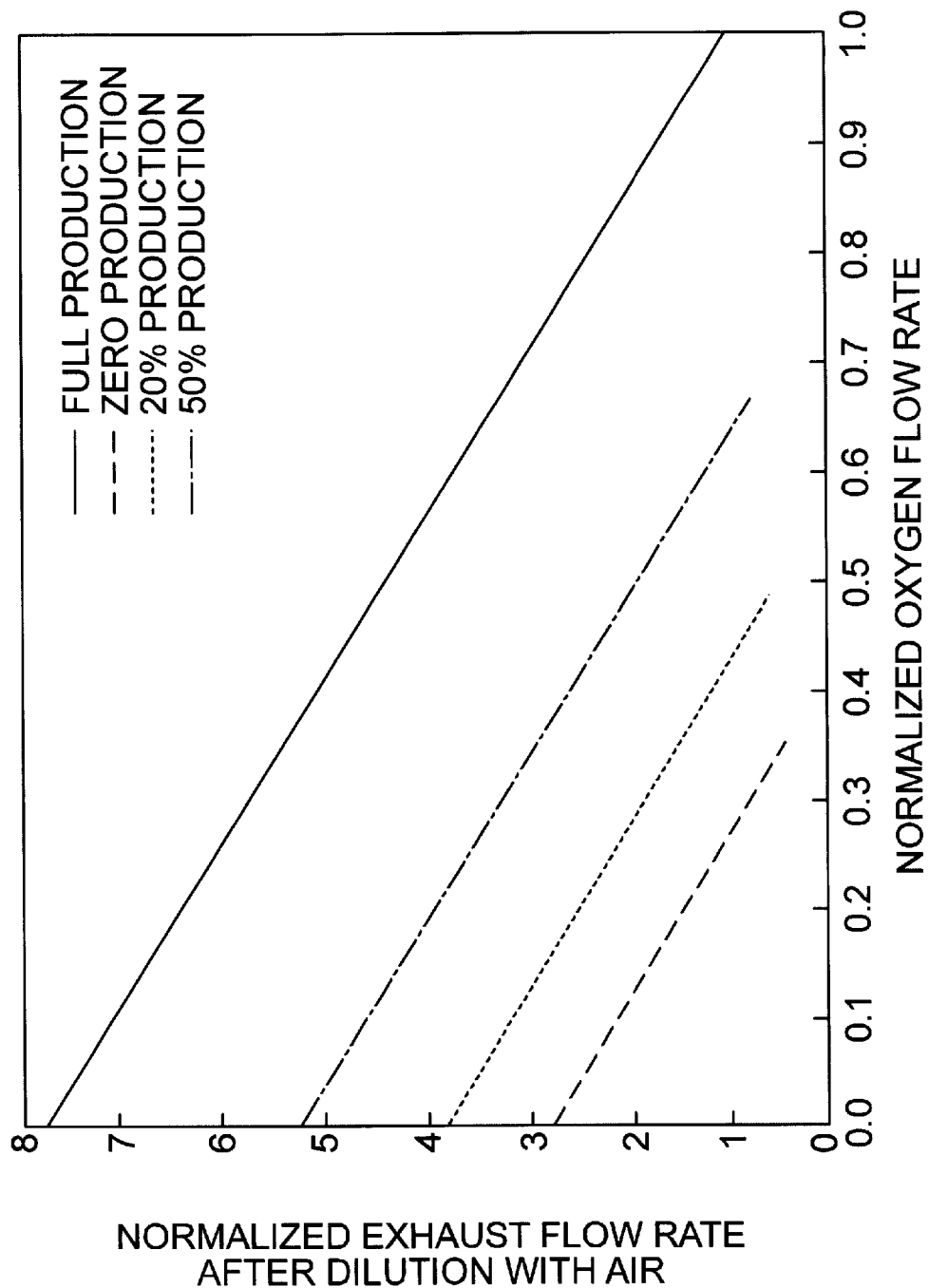
FIG. 8 is a plot of normalized exhaust gas flow rate after dilution with air against oxygen flow rate for production rates between zero and full production.

As a result of the increased flow of hot exhaust gases, much more dilution air must be provided to decrease the temperature to the same level before the gases enter the metal section of the flue system. FIG. 8 shows the result of thermodynamic calculations where furnace exhaust gases at 2800° F. are diluted with air at 77° F. to produce a 1000° F.

gas stream which is a temperature suitable for the metal section of the flue system. The normalized exhaust flow rate after dilution with air is plotted as a function of normalized oxygen flow rate. The exhaust flow is normalized with respect to the 100% oxy-fuel, full production case where exhaust gases at 2800° F. are diluted with air at 77° F. to produce a 1000° F. gas stream. If air is substituted for oxygen under full production conditions and the exhaust gases are diluted with air at 77° F. to produce a 1000° F. stream, the resulting exhaust gas flow rate would be greater than 7.5 times the full production oxy-fuel case. Flue in the exhaust stream. For the case of full production using air instead of oxygen for combustion and water is used for cooling the exhaust gases, the exhaust flow rate is 3.6 times the base case full production, full oxy-fuel case. For 50% production using air instead of oxygen as the oxidant, the exhaust stream volume is about 2.5 times greater than the base case full production, full oxy-fuel case.

The method and apparatus according to the present invention are summarized in Table 1 where a preferred embodiment and acceptable limits are set out.

TABLE 1

Summary of the backup burner and method.

| Preferred Embodiment | Alternate Embodiments |
|---|---|
| 1. Oxy-fuel and air-fuel use same burner block | Burner block is replaced, new holes are drilled in the furnace wall, or existing holes are opened using burner blocks predesigned for air-fuel backup. |
| 2. Oxy-fuel and air-fuel use same mounting replaced, new hardware | Burner block is holes are drilled in the furnace wall, or existing holes are opened using burner blocks predesigned for air-fuel backup. |
| 3. Burner block cross-section is such that the Oxidizer velocity is less than 250 ft/s at the velocity minimum cross-section of the burner or burner body during backup operation. | Burner block cross-section is such that the oxidizer is less than 500 ft/s at the minimum cross-section of the burner block or burner body during backup operation. |
| 4. Air used as oxidant during backup operation | Oxygen concentration during backup operation of less than 50%. |
| 5. Flue gas cooling with water | Flue gas cooling with a combination of water and air. |
| 6. Oxidizer temperature less than 150° F. | Oxidizer temperature less than 1000° F. |
| 7. No additional burner blocks needed during air fuel backup operation | Up to two times the number of burners used for air-fuel operation as were used in oxy-fuel operation |
| 8. More than 80% of full production capacity during air-fuel backup operation | More than 20% of full production capacity during air-fuel backup operation. |
| 9. Superficial velocity in burner block based on total cross-sectional opening less than 90 ft/s for oxy-fuel operation | Superficial velocity in burner block based on total cross-sectional opening less than 400 ft/s for oxy-fuel operation. | systems are not capable of handling this much of an increase in throughput because of pressure drop limitations. The furnace pressure would increase, possibly leading to structural failure.

There are several ways of dealing with the increased flue gas volume: e.g., reduced production, oxygen enrichment for combustion, alternative ways of cooling the flue gases (e.g. with water), using additional flue gas exhaust capability, bypassing the flue gas treatment section, or a combination of two or more of these above methods. A preferred method of resolving the increased volume of flue gases, in accord with the present invention, is to combine water cooling, reduced production, and if necessary oxygen enrichment for combustion.

Figure 9:
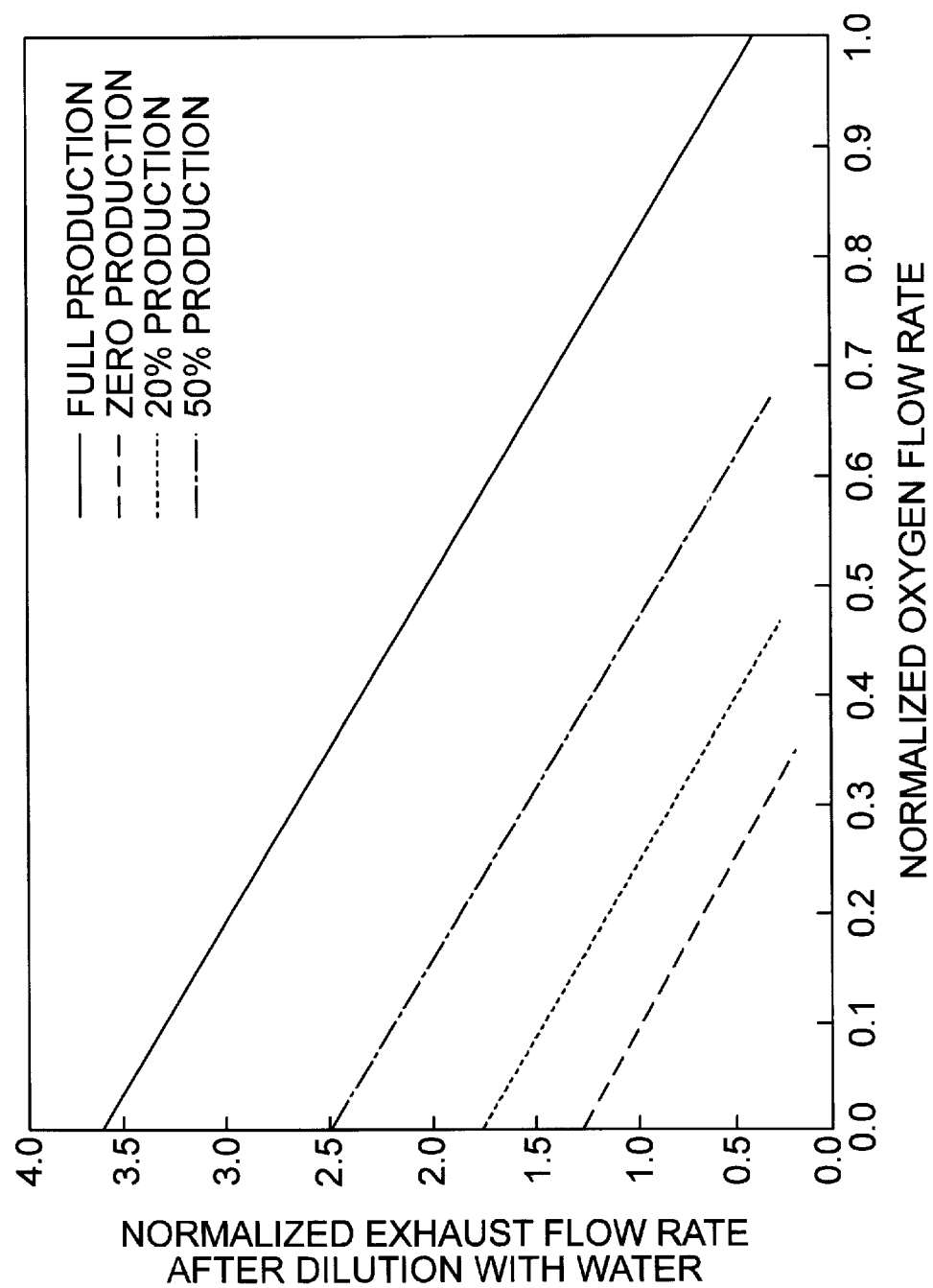
FIG. 9 is a plot of normalized exhaust flow rate after dilution with water against normalized oxygen flow rate for furnace production from zero to full production.

FIG. 9 shows the results of a thermodynamic calculation where liquid water at 77° F. provides evaporative direct contact cooling. The normalized exhaust flow rate after dilution with water is plotted against the normalized oxygen flow rate. The exhaust flow is normalized with respect to the 100% oxy-fuel, full production case where exhaust gases at 2800° F. are diluted with air at 77° F. to produce a 1000° F. gas stream. The figure. shows that the exhaust gas volume can be reduced by 50% for full production oxy-fuel operation when water is substituted for air as the cooling medium Alternatives to the proposed invention are: Option 1) continued 100% oxy-fuel firing with more oxygen storage, Option 2) hot hold with air-fuel heat up burners, and Option 3) hot hold or some production with high momentum oxy-fuel burners using air instead of oxygen. The difference between the proposed invention and option 1 is reduced use of oxygen and expense of storage of liquid oxygen. The difference between the invention and option 2 is continued production and expense. The difference between the invention and option 3 is the technical difficulty of supplying air with a high pressure.

The benefit of the invention compared to option 1 is lower capital cost (fewer LOX storage tanks). Also, depending on the length of time that the on-site oxygen plant is down, the logistics and availability problems of liquid oxygen are avoided. A benefit of the proposed invention over option 1 is that it can function if there is a problem with the oxygen supply lines or flow control skids. Another benefit of the invention compared to option 2 is higher maximum temperature in the furnace with similar temperature profile needed for glass production. Yet another benefit of the invention compared to option 2 is continued production. The most effective process is where full production is continued using air or oxygen enriched air. Even production at a minimum level to sustain a glass ribbon in the float bath is extremely valuable. Reestablishing the glass ribbon is time consuming and could delay production by one or more days. For example, for a flat glass furnace, that produces 600 tons/day, and with glass valued at $300/ton, one days production is worth $180,000. A further benefit of the invention compared to option 2 is that the back-up system is in place. Option 2 requires that an outside company must come to the facility and install their equipment. A still further benefit of the invention is that the furnace refractory does not need to be drilled, cut, or otherwise disturbed.

The present invention provides the user the ability to use different burners for air-fuel and oxy-fuel operation, a common mounting system for air-fuel and oxy-fuel burners, higher maximum furnace temperatures compared to air-fuel heat up burners. The process of the present invention is capable of generating similar temperature distribution in a furnace needed for glass processing, permits higher firing rates at the furnace hot spot by preferentially increasing oxygen concentration, uses separate but closely spaced ports for introduction air and fuel for air-fuel operation, provides, in one aspect, fuel below the air for combustion closer to the charge for better heat transfer to the charge (material being heated), changes the function of pre-combustor/staging ports for air-fuel and oxy-fuel operation. For oxy-fuel operation, the larger opening is used as a pre-combustor with oxygen and fuel flow and the smaller opening for oxygen staging. For air-fuel operation, the larger opening is used for flowing air or oxygen enriched air and the smaller port primarily for fuel.

It is within the scope of the present invention to have a separate burner block or precombustor placed in the furnace wall to introduce air or oxygen enriched air and fuel into the furnace. In this mode the oxy-fuel burner would be turned off (zero firing rate) and the separate burner block would be used to effect combustion according to the teaching of the invention.

It is also within the scope of the present invention to introduce air and fuel into the furnace through separate burners or pipes that are independent of the oxy-fuel burners, so long as the air or oxygen enriched air and fuel are introduced in accord with the teachings of the invention.

Having thus described our invention what is desired to be secured by Letters Patent of the United States is set forth in the appended claims.

What is claimed:

1. A process for maintaining heating of a furnace to an elevated temperature using oxy-fuel combustion, wherein an oxy-fuel flame is introduced into said furnace using an oxy-fuel burner having an oxy-fuel firing rate, and a separate oxidizer stream is introduced underneath said oxy-fuel flame using means disposed beneath said oxy-fuel flame, when oxygen supply for said flame and said oxidizer is eliminated or terminated, comprising the steps of:

introducing one of air or oxygen enriched air into said furnace in place of said oxy-fuel flame; and replacing said separate oxidizer stream with fuel and introducing said fuel into said furnace beneath said one of air or oxygen enriched air to provide an air-fuel flame having a firing rate equal to or greater than said oxy-fuel firing rate to maintain said temperature in said furnace.

2. A process according to claim 1, wherein said furnace is a glass melting furnace with temperature distribution maintained in said furnace by using air fuel combustion except in those burners adjacent a hot spot in said furnace where oxygen enriched air combustion is used.

3. A process according to claim 1, including replacing said oxy-fuel flame with air introduced at a flow rate about 12.6 times greater than the flow rate of one of oxy-fuel or oxygen when only oxy-fuel combustion is used.

4. A process according to claim 1, wherein the velocity of said one of air or oxygen enriched air at a discharge end of said burner is less than about 250 ft/sec.

5. A process according to claim 1, including the steps of introducing oxygen with said fuel to enhance radiation heat transfer to a charge being heated in said furnace.

6. A process according to claim 1, including the steps of cooling exhaust gases exiting said furnace with liquid water, whereby there is a volumetric decrease in said exhaust gas.

7. A process for maintaining heating of a furnace to an elevated temperature using oxy-fuel combustion, wherein an oxy-fuel flame is introduced into said furnace, when oxygen supply for said flame is eliminated or terminated comprising the steps of:

introducing a stream of one of air or oxygen-enriched air into said furnace in place of said oxy-fuel flame; and introducing a separate stream of fuel into said furnace beneath said stream of air or oxygen enriched air to provide an air-fuel flame having a firing rate equal to or greater than said oxy-fuel firing rate to maintain said temperature in said furnace.

8. A process according to claim 7, wherein said furnace is a glass melting furnace with temperature distribution maintained in said furnace by using air fuel combustion except in those burners adjacent a hot spot in said furnace where oxygen enriched air combustion is used.

9. A process according to claim 7, including replacing said oxy-fuel flame with air introduced at a flow rate about 12.6 times greater than the flow rate of one of oxy-fuel or oxygen when only oxy-fuel combustion is used.

10. A process according to claim 7, wherein the velocity of said one of air or oxygen enriched air at a discharge end of a burner used to introduced said one of air or oxygen enriched air into said furnace is less than about 250 ft/sec.

11. A process according to claim 7, including the steps of introducing oxygen with said fuel to enhance radiation heat transfer to a charge being heated in said furnace.

12. A process according to claim 7, including the steps of cooling exhaust gases exiting said furnace with liquid water, whereby there is a volumetric decrease in said exhaust gas.

13. A process for maintaining heating of a furnace to an elevated temperature using oxy-fuel combustion, wherein an oxy-fuel flame is introduced into said furnace and exhaust gases exit said furnace and wherein said exhaust gases must be cooled after exiting said furnace, when oxygen supply for said oxy-fuel flame is eliminated or terminated, comprising the steps of:

(a) replacing said oxy-fuel flame with an air-fuel flame, said air-fuel flame having a firing rate equal to or greater than a firing rate for said oxy-fuel flame; and (b) cooling said exhaust gases exiting said furnace through injection and evaporation of liquid water to decrease the volume of said exhaust gases.

14. A process for maintaining heating of a furnace to an elevated temperature using oxy-fuel combustion, wherein an oxy-fuel flame is introduced into said furnace using an oxy-fuel burner, said burner having an oxy-fuel firing rate, said burner mounted proximate and above a separate passage for introducing an auxiliary fluid, e.g. an oxidizer into said oxy-fuel flame, comprising the steps of closing said separate passage during oxy-fuel combustion and when oxygen supply for said flame is eliminated or terminated replacing said oxy-fuel flame with a stream of air or oxygen-enriched air, opening said separate passage and introducing a stream consisting of fuel into said furnace through said separate passage proximate said stream of air or oxygen-enriched air to provide an air-fuel flame having a firing rate equal to or greater than the oxy-fuel firing rate to maintain said temperature in said furnace.

15. A process according to claim 14, wherein said furnace is a glass melting furnace with temperature distribution maintained in said furnace by using air fuel combustion except in those burners adjacent a hot spot in said furnace where oxygen enriched air combustion is used.

16. A process according to claim 14, including replacing said oxy-fuel flame with air introduced at a flow rate about 12.6 times greater than the flow rate of one of oxy-fuel or oxygen when only oxy-fuel combustion is used.

17. A process according to claim 14, wherein the velocity of said one of air or oxygen enriched air at a discharge end of said burner is less than about 250 ft/sec.

18. A process according to claim 14, including the steps of introducing oxygen with said fuel to enhance radiation heat transfer to a charge being heated in said furnace.

19. A process according to claim 14, including the step of cooling exhaust gases exiting said furnace with liquid water, to decrease the volume of said exhaust gases.

20. A process for maintaining heating of a furnace to an elevated temperature using oxy-fuel combustion when oxygen supplied for said oxy-fuel flame is eliminated or terminated, comprising the steps of; replacing said oxy-fuel flame with an air-fuel flame, said the air fuel flame having a firing rate equal to or greater than a firing rate for said oxy-fuel flame, and cooling exhaust gases exiting from said furnace through injection and evaporation of liquid water to decrease the volume of said exhaust gases.

21. A process for using air or oxygen enriched air-fuel as a substitute for oxy-fuel combustion, in the event oxygen supply is diminished, or interrupted in order to maintain heating in an industrial environment comprising the steps of introducing said air or oxygen enriched air into said environment in sufficient volume with a full to effect the required level of heating, said substitution of air or oxygen enriched air-fuel combustion for oxy-fuel combustion made in a manner to achieve equivalent heating to that obtained using oxy-fuel combustion.

22. A process according to claim 21, including the step of water cooling exhaust gases from said industrial environment in order to lower said exhaust gas volume.

* * * * *